US009029734B2

(12) United States Patent
Peters et al.

(10) Patent No.: US 9,029,734 B2
(45) Date of Patent: May 12, 2015

(54) SYSTEMS AND METHODS TO FEED A WIRE WITHIN A WELDER

(71) Applicant: Lincoln Global, Inc., City of Industry, CA (US)

(72) Inventors: Steven R. Peters, Huntsburg, OH (US); Edward A. Enyedy, Eastlake, OH (US)

(73) Assignee: Lincoln Global, Inc., City of Industry, CA (US)

( * ) Notice: Subject to any disclaimer, the term of this patent is extended or adjusted under 35 U.S.C. 154(b) by 0 days.

(21) Appl. No.: 14/331,271

(22) Filed: Jul. 15, 2014

(65) Prior Publication Data
US 2014/0319113 A1 Oct. 30, 2014

Related U.S. Application Data

(62) Division of application No. 13/351,599, filed on Jan. 17, 2012, now Pat. No. 8,803,034.

(51) Int. Cl.
| | | |
|---|---|---|
| *B23K 9/12* | (2006.01) | |
| *B23K 9/06* | (2006.01) | |
| *B23K 9/133* | (2006.01) | |
| *B65H 51/10* | (2006.01) | |

(52) U.S. Cl.
CPC .............. *B23K 9/1336* (2013.01); *B23K 9/125* (2013.01); *B65H 51/10* (2013.01); *B65H 2701/36* (2013.01)

(58) Field of Classification Search
CPC ...... B23K 9/1336; B23K 9/073; B23K 9/125; B23K 9/12; B23K 9/06; B65H 1/10; B65H 2701/36
USPC .............. 219/137.7, 137.41, 130.31, 130.01, 219/124.01
See application file for complete search history.

(56) References Cited

U.S. PATENT DOCUMENTS

| | | | |
|---|---|---|---|
| 1,904,086 A | 4/1933 | Sandelowsky | |
| 3,799,215 A | 3/1974 | Willems | |
| 3,828,827 A | 8/1974 | Witt et al. | |
| 3,940,586 A * | 2/1976 | Stearns et al. | 219/75 |
| 4,437,600 A | 3/1984 | Storr | |
| 5,399,837 A * | 3/1995 | Mangelsen et al. | 219/137.7 |
| 5,916,464 A | 6/1999 | Geiger | |
| 6,064,036 A * | 5/2000 | Kensrue | 219/137.2 |
| 6,969,823 B2 | 11/2005 | Huismann et al. | |
| 6,984,806 B2 | 1/2006 | Huismann et al. | |

(Continued)

FOREIGN PATENT DOCUMENTS

| | | |
|---|---|---|
| FR | 1325666 A | 5/1963 |
| JP | 06031365 A | 2/1994 |
| JP | 2007260758 A | 10/2007 |

OTHER PUBLICATIONS

International Search Report and Written Opinion for corresponding application PCT/IB2013/000057, dated Jul. 4, 2013.

*Primary Examiner* — Tu B Hoang
*Assistant Examiner* — Alba Rosario-Aponte
(74) *Attorney, Agent, or Firm* — Hahn Loeser & Parks LLP

(57) ABSTRACT

The subject embodiments relate to a retractable wire feed system used within a welder, which include a friction-drive system disposed on a first side of a wire, an idle drive roll located opposite the friction-drive system on a second side of a wire, wherein the friction-drive system advances the wire through a welding nozzle toward a workpiece, and a brake, which is applied to retract the wire when a predetermined condition is met.

12 Claims, 7 Drawing Sheets

(56) References Cited

U.S. PATENT DOCUMENTS

| | | |
|---|---|---|
| 7,102,099 B2 | 9/2006 | Huismann et al. |
| 7,351,933 B2 | 4/2008 | Huismann et al. |
| 7,364,059 B2 | 4/2008 | Huismann et al. |
| 7,554,056 B2 | 6/2009 | Huismann et al. |
| 2005/0056629 A1 | 3/2005 | Huismann et al. |
| 2007/0000893 A1 | 1/2007 | Huismann et al. |
| 2009/0026188 A1 | 1/2009 | Schorghuber |
| 2009/0242532 A1* | 10/2009 | Huismann et al. ......... 219/130.1 |
| 2009/0242534 A1 | 10/2009 | Artelsmair et al. |
| 2010/0096375 A1* | 4/2010 | Daniel ..................... 219/137.31 |
| 2012/0067859 A1* | 3/2012 | Albrecht et al. .......... 219/137 R |
| 2012/0223063 A1 | 9/2012 | Tanaka et al. |

* cited by examiner

SYSTEMS AND METHODS TO FEED A WIRE WITHIN A WELDER

CROSS-REFERENCE TO RELATED APPLICATIONS

This application is a divisional of and claims priority to and fully incorporates by reference, pending U.S. patent application Ser. No. 13/351,599 filed 17 Jan. 2012.

TECHNICAL FIELD

The present disclosure is related to manipulation of wire, and more particularly, to a wire feed system that advances and retracts wire within a welding system.

BACKGROUND OF THE INVENTION

Electric arc welders are employed to weld metals together by using a power source to pass a current between an electrode and a workpiece. In some applications, the electrode is a continuous wire drawn from a drum or reel, which is advanced through a contact tip, melted and deposited onto the workpiece. Wire feeders are often used to advance the wire, preferably in a consistent and controllable manner, to the contact tip for use in the welding operation. Wire feeders can be manufactured in several forms, each optimized for a specific application.

In certain electric arc welding operations, a short circuit welding process is employed that includes an arc state and a short circuit state in each of a plurality of low frequency welding cycles. The power supplied to a welding electrode in this process is controlled according to a detected short circuit state to accurately control heat and reduce weld spatter. To facilitate transition between the arc state and the short circuit state, a wire feeder that allows both advancement and retraction of wire can be used to enhance the short circuit welding process. In operation, the short circuit state is entered by advancing the wire until the wire touches the weld pool. The arc state is entered by retracting the wire until the wire does not touch the weld pool, wherein an arc is formed.

To be effective, wire direction must be reversed within an abbreviated window of time, such as 5-10 milliseconds. Due to the inertia of conventional wire feeders, however, wire manipulation within this short window of time is difficult, if not impossible. Previous solutions using stepper or servo motors have proven ineffective as coordination of output is overly complex and/or may not meet necessary physical demands over a long time period. In view of these deficiencies, systems and methods are needed to minimize inertia of wire feeders to facilitate long term implementation thereof.

SUMMARY OF THE INVENTION

In one aspect, a wire feed system is used with a welder. The wire feed system includes a pair of counter-rotating discs disposed along a common longitudinal axis that are spaced apart a first width. A first disc rotates in a first direction and a second disc rotates in a second direction which is opposite the first direction. A drive roll is disposed between the first disc and the second disc within the first width. An engaging member moves the drive roll adjacent to either the first disc or the second disc based on a predetermined condition to advance or retract wire relative to a workpiece within the welding system.

In another aspect, a wire feed system is used within a welder. A forward drive roll rotates in a first direction and a reverse drive roll rotates in a second direction, which is opposite the first direction. The forward drive roll and the reverse drive roll are both located on a first side of a wire. A first idle roll disposed opposite the forward drive roll and a second idle roll is disposed opposite the reverse drive roll. The first idle roll and the second idle roll are located on a second side of the wire. An arm couples the first idle roll to the second idle roll. An actuator displaces the first idle roll to engage with the forward drive roll to advance the wire or displaces the second idle roll to engage with the reverse drive roll to retract the wire based upon a predetermined condition.

In yet another aspect, a retractable wire feed system is used within a welder, wherein a friction-drive system is disposed on a first side of a wire. An idle drive roll is located opposite the friction-drive system on a second side of a wire, wherein the friction-drive system advances the wire through a welding nozzle toward a workpiece. A brake, is applied to retract the wire when a predetermined condition is met.

This brief description is provided to introduce a selection of concepts in a simplified form that are further described herein. This brief description is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION OF THE INVENTION

Figure 1:
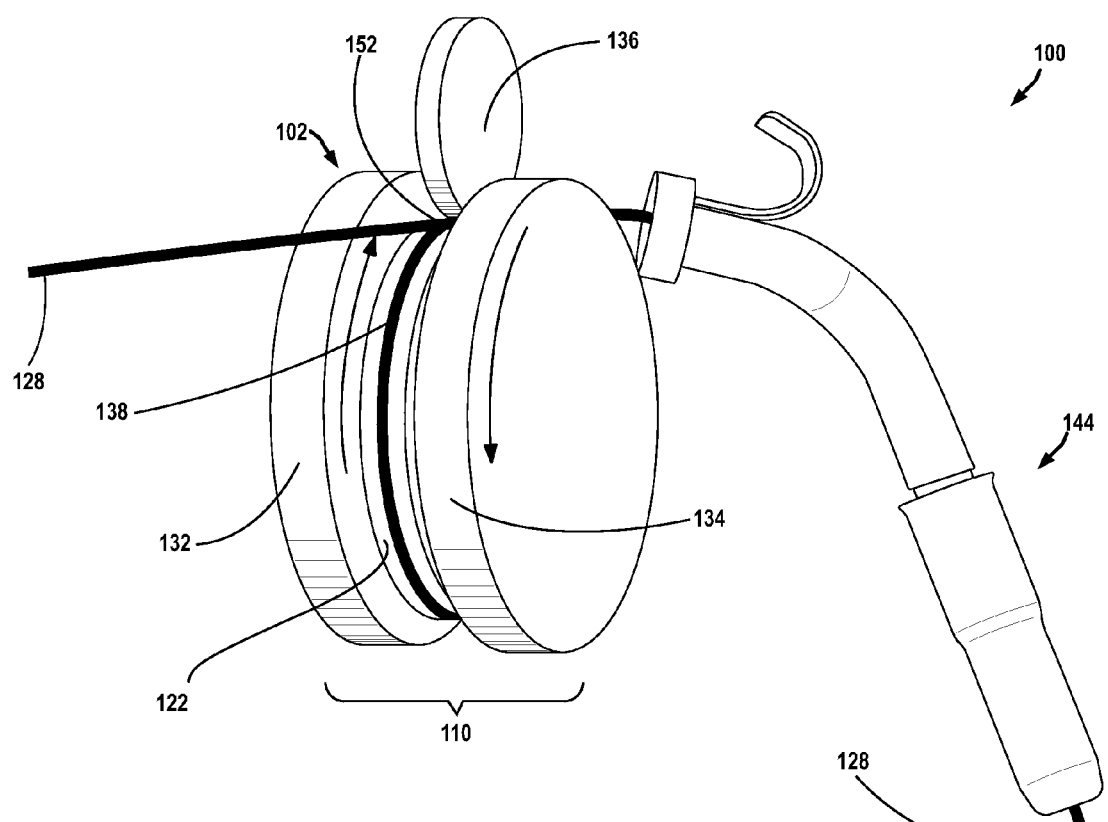
FIG. 1 is a perspective view of a wire feed system that includes a set of counter-rotating discs that are alternately engaged with a drive roll to manipulate wire within a welding system.

Referring now to the figures, several embodiments or implementations of the present invention are hereinafter described in conjunction with the drawings, wherein like reference numerals are used to refer to like elements throughout. The present disclosure is related to a wire feed system that manipulates wire relative to a short circuit state within a welder. Although illustrated and described hereinafter in the context of various exemplary welding systems, the invention is not limited to the illustrated examples.

Referring now to the drawings, FIG. 1 is a perspective view of a weld system 100 that includes wire feed system 102 to advance and retract wire 128 relative to a weld location. Wire feed system 102 includes a set of counter-rotating discs 110 that are alternately engaged with drive roll 122 upon occurrence of a predetermined condition. As shown, wire feed system 102 is disposed upstream from weld nozzle 144, which is used to deliver wire 128 to a weld location. In an example, wire 128 is a consumable wire used in association with a suitable weld operation, including shielded metal arc welding (SMAW), manual metal arc welding (MMAW), gas metal arc welding (GMAW), flux-cored arc welding (FCAW), and submerged arc welding (SAW) processes. Wire 128 can range in diameter commensurate with particular weld process requirements and can be made from material that is compatible with material that is welded, such as steel, cast iron, nickel, aluminum, and copper.

In operation, wire 128 is fed through the set of counter-rotating discs 110 into the weld nozzle 144. Set of counter-rotating discs 110 is employed to either advance or retract the wire 128 within the weld system 100 correspondent with one or more events, such as a particular condition, metric, or value associated with a weld process executed by weld system 100. The event can be monitored to determine if advancement, retraction or no movement of the wire is appropriate. In an example, advancement or retraction of wire can occur commensurate with a value, change in value, and/or derivative of any measured value of a weld process signal waveform including a current, a voltage, and/or a wire feed speed signal. A signal waveform value can be indicative of a state within the weld process, such as a short circuit state or an arc state. Wire movement that is timed to correlate with such a state can enhance weld process efficiency, quality of weld or other condition.

Drive roll 122 and idle roll 136 are disposed in a stacked vertical arrangement wherein a gap 152 is located therebetween to accommodate wire 128. Idle roll 136 and/or drive roll 122 are positionable to create a variable-sized gap 152 to insure that rolls 122, 136 mechanically engage wire 128 as it is fed from a source (e.g., coil) to the weld nozzle 144. Creating an appropriate sized gap 152 can insure that proper tension is applied regardless of wire 128 diameter. Drive roll 122 is disposed below wire 128 and fixed around a first axle (not shown in FIG. 1) to facilitate rotation of the drive roll around an axis. Similarly, idle roll 136 is fixed around a second axle (not shown in FIG. 1) to facilitate rotation of the idle roll around an axis. Idle roll 136 is meant to facilitate movement of wire 128 and is not generally coupled to a drive and/or gearing to allow free rotation thereof. In this manner, idle roll 136 and drive roll 122 work in concert to insure stable and continuous movement of the wire within the wire feed system 102. To enhance the surface friction of the drive roll, gripping surface 138 can be adhered or otherwise mechanically coupled to the outside circumference of drive roll 122. Gripping surface 138 can effectively engage wire 128 as it passes through the wire feed system 102. Gripping surface 138 can be comprised of substantially any high-friction material including a polymer, a rubber, or other suitable material.

Drive roll 122 assumes a direction and speed from the set of counter-rotating discs 110, which is mechanically coupled to a drive system (not shown in FIG. 1). In one embodiment, the drive system includes a motor, a gear box and a drive mechanism to transfer rotational motion from the motor to the set of counter-rotating discs 110. The set of counter-rotating discs 110 includes first disc 132 and second disc 134 that are positioned in a spaced apart relationship by a first width on either side of drive roll 122 and fixed along the same longitudinal axis. First disc 132 rotates in a first direction and second disc 134 rotates in a second direction, wherein the second direction is opposite the first direction. In this example, first disc 132 rotates in a clockwise direction while second disc 134 rotates concurrently in a counter-clockwise direction. For this purpose, suitable gearing can be employed between a drive system and discs 132, 134 to facilitate rotational direction of one disc opposite the other. It is to be appreciated that while a single drive system is described herein, substantially any number of drive systems, gear boxes, and/or drive mechanisms can be employed to facilitate the rotation of the first disc and the second disc within set of counter-rotating discs 110.

Rotating discs 132, 134 provide an active, low inertia rotational source for wire 128 as it passes through wire feed system 102. To manipulate wire 128, drive roll 122 is engaged with either first disc 132 or second disc 134 depending upon the direction of movement desired. For this purpose, drive roll 122 can be mechanically displaced along the longitudinal axis to mechanically interface with disc 132 or 134 for a duration of time. In a short time period subsequent to the interface, drive roll 122 will assume the speed and direction of either disc 132 or disc 134 thereby advancing or retracting wire 128 for the duration of time. Once the duration of time is complete, drive roll 122 can be disengaged with the disc and engaged with the other disc or remain positioned between discs to rotate freely. This process can be implemented repeatedly throughout a weld cycle to enhance weld quality. For example, retraction of wire immediately subsequent to a short circuit condition can reduce spatter, which is otherwise deleterious to weld quality.

An actuator or other suitable means can be employed to mechanically displace (e.g., push or pull) the drive roll along its longitudinal axis to mechanically interface drive roll 122 against the surface of either disc 132 or disc 134. Once mechanical displacement has occurred, lateral surfaces of each disc will mesh or otherwise mechanically couple to allow the drive roll 122 to assume the same speed and direction as either disc 132 or disc 134 to which it is engaged. For this purpose, a high-friction coating or other material can be applied to the engaging surfaces to enhance the mechanical coupling of the drive roll 122 and discs 132, 134. Since the discs 132, 134 are already in motion when engagement occurs, the drive roll 122 can quickly assume the speed of the disc without encountering a delay as would be necessitated when overcoming inertia of a wheel at rest or rotating in a direction opposite than desired. As the wire 128 is fed in a direction and speed commensurate with drive roll 122, the subject embodiments can be employed to implement a highly responsive wire feed system to advance and/or retract consumable wire during a weld operation.

Figure 6:
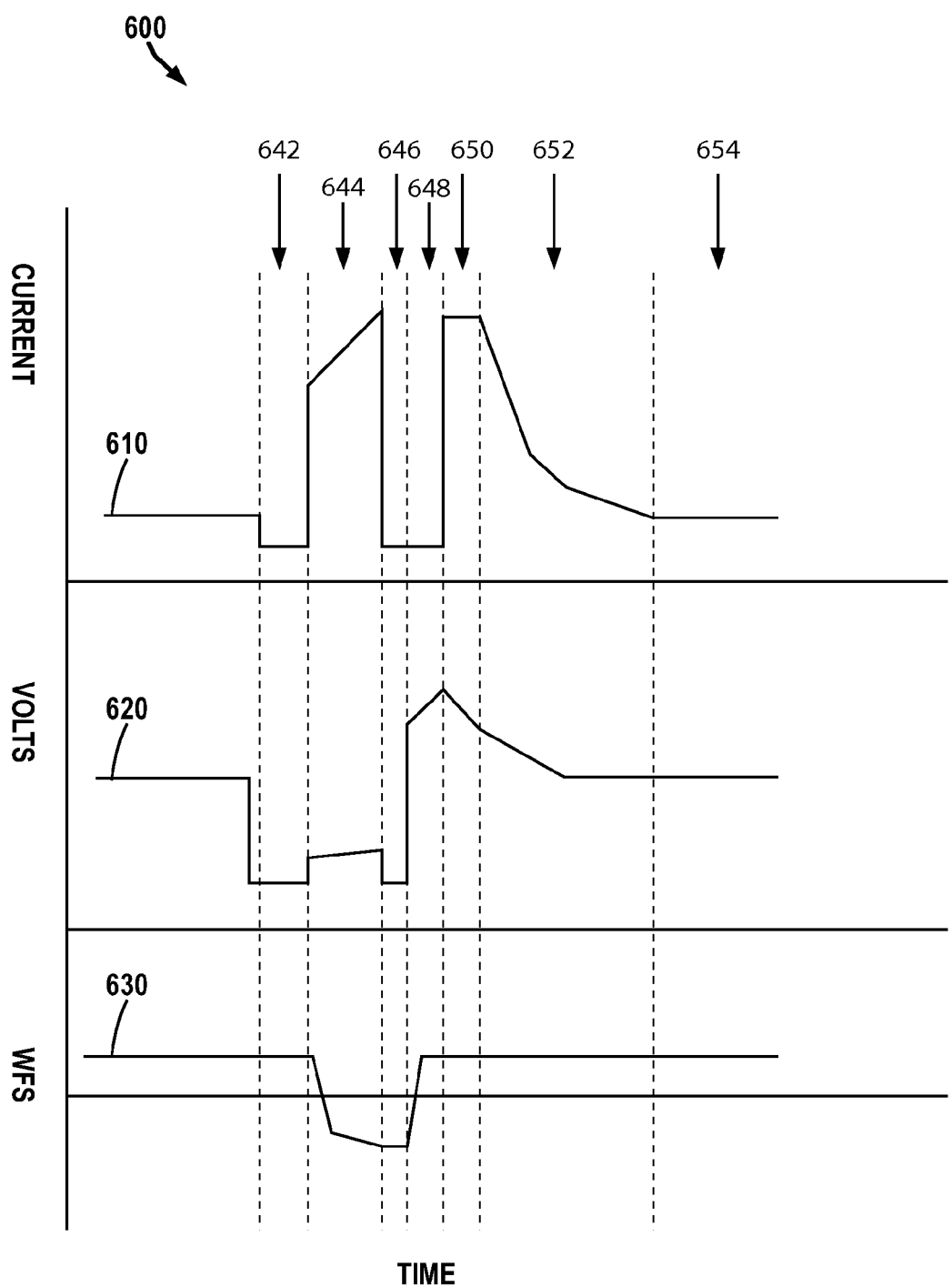
FIG. 6 depicts a plurality of exemplary waveforms within a weld process implemented by subject weld systems.

In an embodiment, engagement of drive roll 122 is predicated upon a waveform within the welding process. For instance, a current waveform can be monitored to identify events within the welding process, including an arc state and a short circuit state, wherein the speed and direction (e.g., advancement or retraction) of a consumable wire is modified in association therewith. FIG. 6 illustrates a typical weld cycle 600 that can be implemented by an electric weld system, such as the weld system 100. Exemplary current waveform 610, voltage waveform 620, and wire feed speed waveform 630 are shown relative to time within the weld cycle 600. Time periods 642, 644, 646, 648, 650, 652, and 654 are depicted along each waveform to indicate particular events within the weld cycle 600.

In an example, current waveform 610 follows time periods 642-654 as follows. Time periods 642, 644 and 646 represent a short circuit state, wherein weld wire is shorted to a workpiece. Current is subsequently increased during time period 644 to pinch off the shorted bridge between the weld wire and workpiece. During time period 646, the short circuit is about to break, wherein current is reduced. Such reduction in current can also trigger an output to engage drive roll 122 with second disc 134. This drive roll engagement can occur during time period 648 when the short circuit breaks. Drive roll 122 assumes the rotation and speed of second disc 134 in a counter-clockwise direction. Such rotation will retract wire 128 between drive roll 122 and idle roll 136. In this manner, weld wire is retracted from the workpiece as current is reduced to minimize weld spatter and to maintain the integrity of a weld. During time period 650 an arc state is resumed, current is increased to separate the weld wire from a weld puddle thereby creating a droplet of metal from the weld wire. This current increase can also be used to trigger a second output to disengage drive roll 122 from second disc 134 and engage with first disc 132 to advance wire 128 through weld nozzle 144. The arc state continues during time period 652 when the current value tapers and remains at a low level during time period 654 until the process repeats with a subsequent short circuit state at time period 642.

In an embodiment, a control signal is sent to an actuator, wherein the control signal represents a particular condition related to a weld within the weld system 100 to indicate appropriate advancement or retraction of the wire commensurate therewith. In turn, the control signal can actuate a mechanical device that is used to place drive roll 122 against one of the continuously rotating discs 132, 134 to match rotational speed and direction as appropriate. Wire 128 is advanced through wire feed system 102 and out of weld nozzle 144 when drive roll 122 is mechanically coupled against first disc 132. Advancement of the wire continues until a predetermined condition occurs (e.g. detection of a short circuit state), wherein the actuator engages a mechanical device to displace drive roll 122 away from first disc 132 to engage against second disc 134. This process can repeat cyclically commensurate with a typical weld cycle, which experiences a plurality of short circuit states that occur intermittently with arc states in an electric weld process. In an example, wire feed system 102 described herein is employed with a modified STT® waveform which is a particular type of short circuit welding process known in the art and pioneered by Lincoln Electric.

Figure 2:
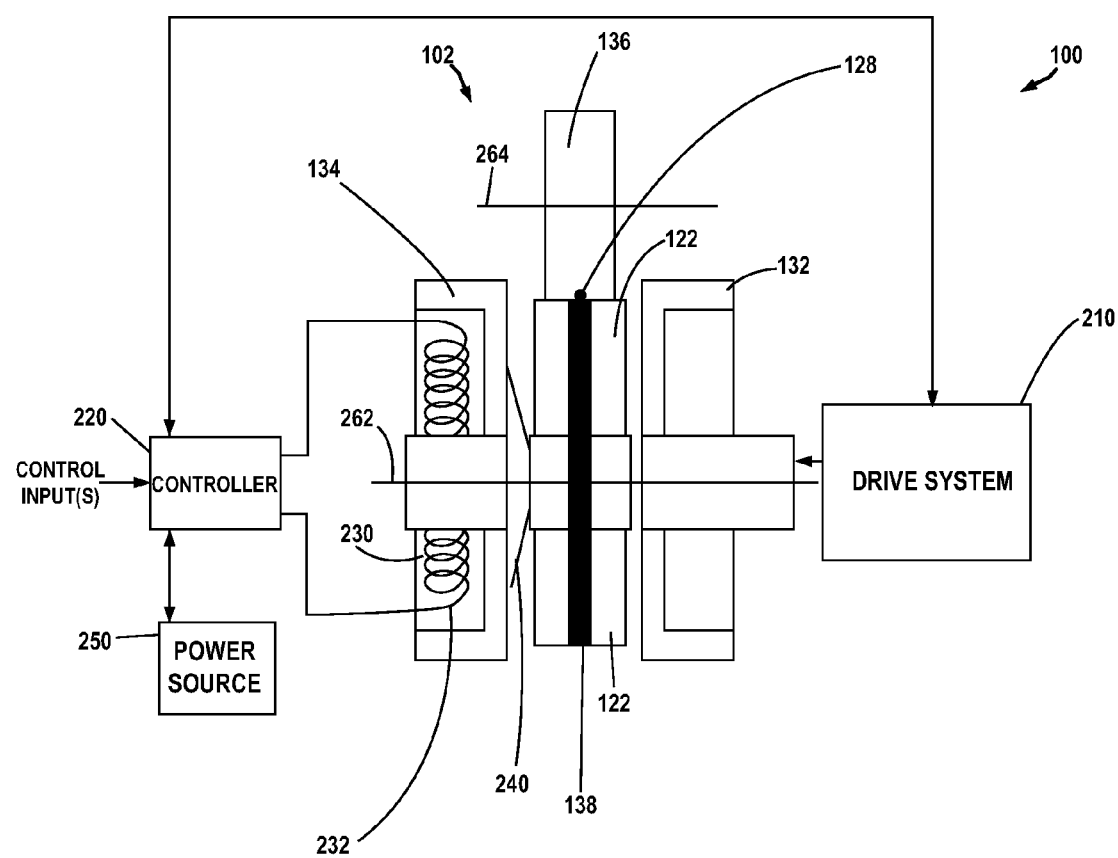
FIG. 2 is an elevation view of the wire feed system of FIG. 1 that shows the counter-rotating discs in relation to the drive roll and an idle roll to manipulate wire within a welding system.

FIG. 2 is an elevation view of weld system 100, which includes the wire feed system 102 depicted in FIG. 1. Weld system 100 further includes drive system 210 that is employed to drive first disc 132 and second disc 134 to facilitate rotational movement of both discs thereof around axle 262. Drive system 210 is coupled to controller 220, which provides one or more control signals to dictate operation of drive system 210. Controller 220 is also coupled to electromagnet 230 and power source 250, which is used to provide power to the facilitate a weld operation by the weld system 100.

Controller 220 can activate electromagnet 230 to displace platen 240 against second disc 134 upon activation. For this purpose, it is understood that the platen is made of a suitable material that is responsive to the magnetic field generated when the electromagnet is activated. Activation of electromagnet 230 can occur when power source 250, utilized to drive the weld operation of the weld system 100, indicates that a particular condition is impending. Wire 128 is retracted from the weld area as drive roll 122 is engaged with second disc 134 thereby rotating in a counterclockwise direction. When electromagnet 230 is no longer activated, platen 240 can displace drive roll 122 back against first disc 132 to allow clockwise rotation to advance wire 128 back toward the weld area. This process can be performed in a cyclical manner throughout a weld operation wherein wire 128 is advanced and retracted repeatedly to enhance weld quality.

In an example, controller 220 can monitor and evaluate one or more waveforms of power source 250 used in a weld operation including a voltage waveform, a current waveform, and/or a wire feed speed waveform, as set forth in FIG. 6. By monitoring such waveforms within power source 250, controller 220 can determine an appropriate time to output a control signal to activate electromagnet 230 thereby advancing or retracting wire 128 at appropriate events. In an example, controller 220 identifies a change within the voltage waveform that is greater than a particular value or percentage (e.g., from time period 654 to 642). This change can be from a first value to a second value close to zero, which indicates a short circuit condition. The change in value within the voltage waveform can be read by controller 220 from power source 250, wherein the disparity is compared to predetermined threshold.

Once the threshold is exceeded, controller 220 can send an output to activate electromagnet 230 thereby drawing drive roll 122 against second disc 134 to retract wire 128. In this manner, the timing of electromagnet activation can mitigate the duration of a short circuit state within which a weld occurs. To achieve such mitigation, wire feed system 102 can retract wire 128 in response to this condition to minimize the period of time in which a short circuit occurs. For this purpose, the current can be increased to help facilitate a break in the short circuit, thereby melting the metal short circuited to the workpiece to return to an arc state. Built in delays or other variables can be employed with the waveform as monitored to ensure that particular mechanical changes in wire direction are made at suitable times within the weld process. Alternatively or in addition, control inputs can be received by controller 220 indicative of various weld system component states or conditions that may warrant manipulation of wire 128.

Once electromagnet 230 receives a signal from controller 220, current can be delivered to coil 232 within electromagnet 230. Once coil 232 is energized, a magnetic field is generated, thereby drawing platen 240 against second disc 134. For this purpose, platen 240 can be at least partially comprised of steel, iron, or other suitable magnetic material. Platen 240 can be mechanically coupled to the drive roll 122 such that activation of the electromagnet 230 mechanically draws drive roll 122 against second disc 134 to rotate in concert therewith. In an embodiment, idle roll 136 is laterally displaced along axle 264 at the same time and distance as drive roll 122. Once the electromagnet is deactivated and current is no longer delivered to coil 232, platen 240 can return to its previous condition. In an embodiment, platen 240 can have an resilient deformative property, wherein the platen pushes drive roll 122 against first disc 132 to continue to advance the wire through weld nozzle 144.

Figure 3:
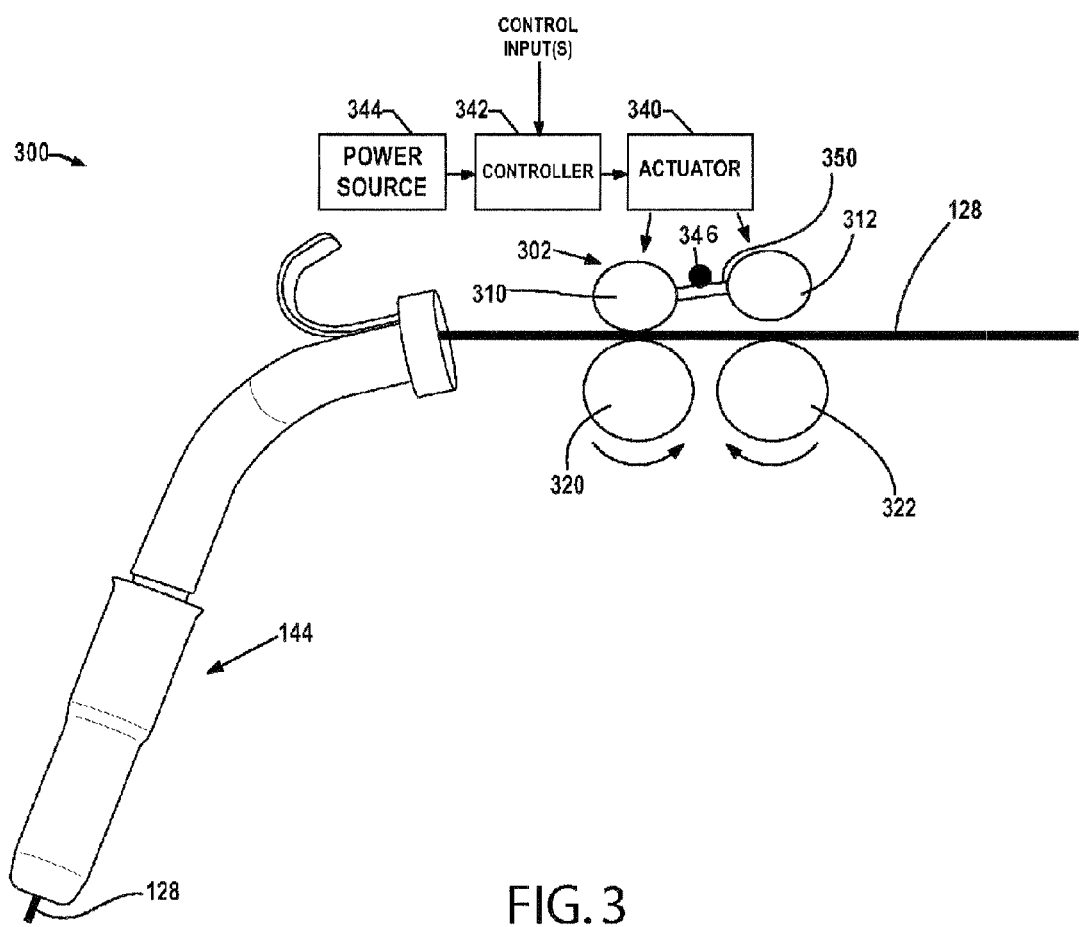
FIG. 3 is an elevation view of a wire feed system that includes a pair of drive rolls that are alternately engaged to manipulate wire within a welding system.

FIG. 3 is an elevation view of another embodiment of weld system 300 that includes wire feed system 302 to advance and retract wire 128 within weld nozzle 144. Wire feed system 302 includes first idle roll 310 and second idle roll 312 which are mechanically coupled via arm 350. First idle roll 310, second idle roll 312, and arm 350 are disposed on a first side (e.g., above) of wire 128. Forward drive roll 320 and reverse drive roll 322 are located on a second side (e.g., below) of wire 128 as depicted. In operation, first idle roll 310 is engaged with forward drive roll 320 and second idle roll is engaged with reverse drive roll 322 in an alternative configuration. In an embodiment, when advancement of wire 128 is desired, first idle roll 310 is engaged with forward drive roll 320. When retraction of wire 128 is desired, second idle roll 312 is engaged with the reverse drive roll 322.

To facilitate this alternative engagement, actuator 340 receives a signal output from controller 342 based at least in part upon a state or condition of power source 344. Controller 342 can thereby alternatively displace first idle roll and second idle roll such that either is engaged with the wire 128 at a particular point in time. Selectable displacement of first idle roll 310 and second idle roll 312 facilitates advancement and retraction of the wire based upon a pre-determined condition, as described with reference to FIGS. 1 and 2 above. In an embodiment, actuator 340 is a pneumatic solenoid which is activated upon introduction of a particular control signal to mechanically displace the arm 350 relative to a center pivot location 346. It is to be appreciated, however, that substantially any device or actuator can be employed to alternately displace idle rolls 310, 312. Such displacement rotates arm 350 thereby displacing one of first idle roll 310 or second idle roll 312 against wire 128 based upon a desired direction of wire manipulation. In other embodiments, neither first idle roll 310 or second idle roll 312 are displaced wherein wire 128 is not manipulated for a given period of time.

As described above with reference to FIGS. 1 and 2, forward drive roll 320 and reverse drive roll 322 are set in motion at a constant speed in opposite directions (e.g. clockwise and counter-clockwise) relative to the weld location. The forward drive roll and reverse drive roll can be in continuous motion whenever the weld system 300 is active. In this manner, inertia associated with wire feed system 302 is minimized as a necessary rotational displacement is engaged in an as-needed basis. Such a system provides advantages over those conventionally employed as the ramp up from an object at rest to a desired velocity is not required.

Figure 4:
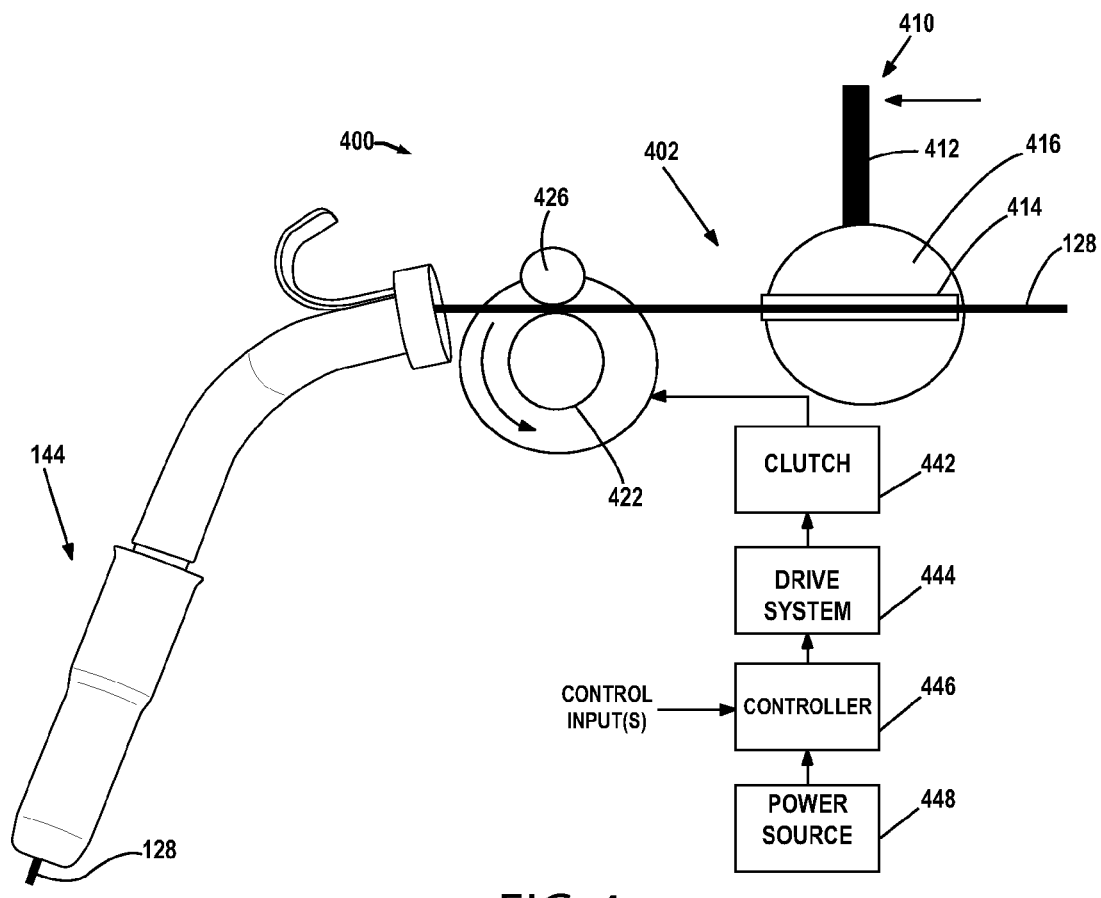
FIG. 4 is an elevation view of a wire feed system that includes a friction drive system and a brake to manipulate wire within a welding system.
Figure 5:
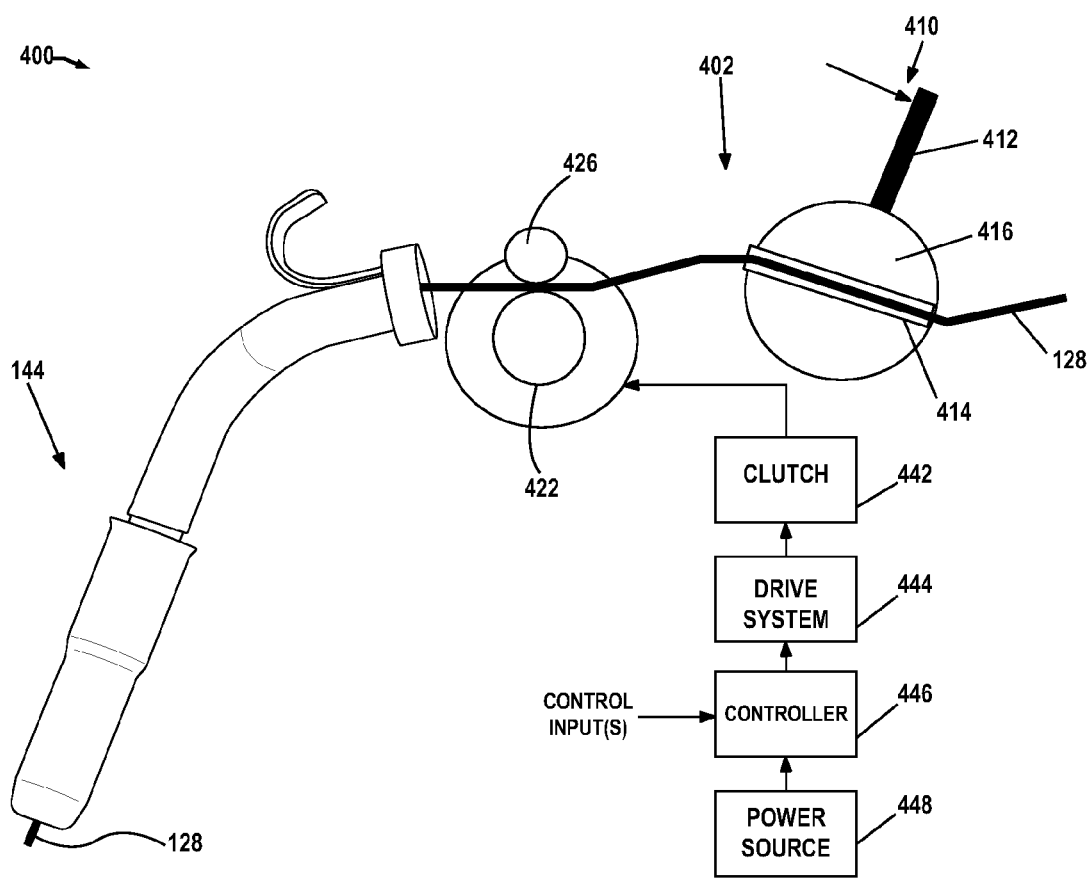
FIG. 5 is an elevation view of the wire feed system of FIG. 4 wherein the brake is applied to manipulate wire within a welding system.

FIGS. 4 and 5 illustrate an elevation view of yet another embodiment of weld system 400 that includes wire feed system 402. Wire feed system 402 includes a friction drive and a brake that are alternately employed to advance and retract wire 128 within weld nozzle 144. Friction drive includes drive wheel 422 which is engaged to drive system 444 as determined by clutch 442. Power source 448, utilized to facilitate weld operation of the weld system 400, is monitored and evaluated by controller 446 to identify one or more conditions to modify manipulation of wire 128 within wire feed system 402. Exemplary operation of controller 446 to advance or retract wire is discussed above with reference to FIGS. 1 and 2. In an example, controller 446 identifies an impending short circuit state to retract wire 128 is response thereto.

In weld system 400, drive wheel 422 advances wire 128 as it passes between drive wheel 422 and idle wheel 426. Advancement of wire 128 continues until a pre-determined condition is met (e.g., short circuit state), whereby the controller sends a signal to drive system 444 to engage clutch 442 to decouple drive wheel 422 from drive system 444. Decoupling of drive wheel 422 from drive system 444 effectively discontinues advancement of the wire 128 through the weld nozzle 144 and toward a weld location. At or about the same time, brake 410 is applied to retract wire 128. Brake 410 can include arm 412 coupled to wheel 416, which is mechanically coupled to sleeve 414. Wire 128 is drawn through brake 410 via sleeve 414 and on to drive wheel 422 as depicted.

As shown in FIG. 5, once the clutch 442 is engaged and drive system 444 is decoupled from drive wheel 422, force is applied to arm 412. This application of force rotates wheel 416 and sleeve 414 to retract wire 128 from within the weld nozzle 144 and away from the weld location. Once controller 446 has determined that a particular condition has passed (e.g., arc state is impending), clutch 442 can be disengaged to re-couple drive system 444 to drive wheel 422. At or about the same time, the application of force can be discontinued against brake 410 to return to a disengaged state as set forth in FIG. 4. This process can repeat as necessary commensurate with the identification of one or more predetermined conditions.

Figure 7:
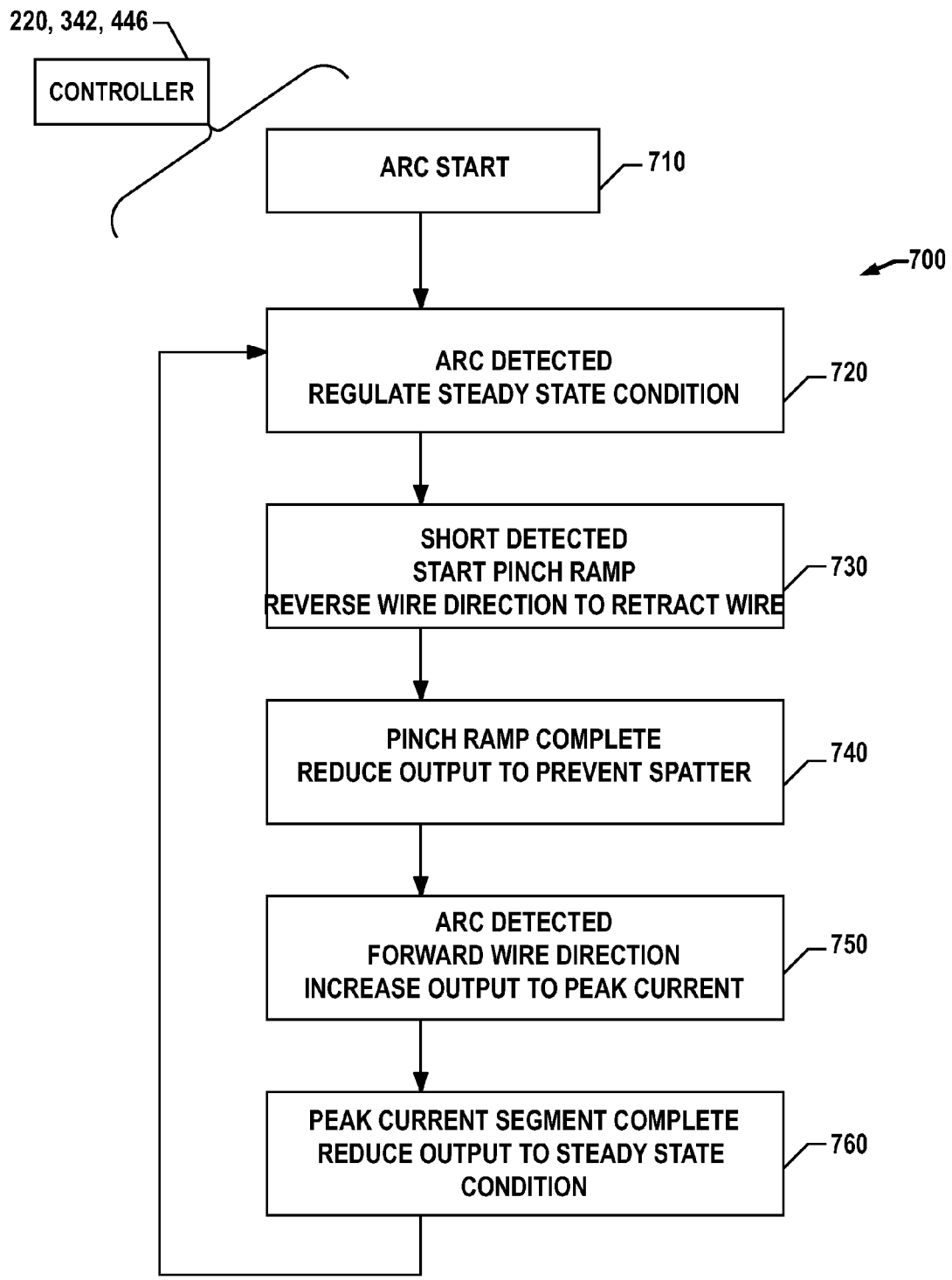
FIG. 7 is a methodology to manipulate wire relative to a short circuit state within a welding system.

FIG. 7 illustrates a methodology 700 to manipulate wire relative to a short circuit state within a welding system. At reference numeral 710, an arc is started within an electric weld system. At 720, the arc is detected and a steady state condition is regulated within a power source (e.g. power source 250, 344, 448). At 730, a short circuit state is detected wherein a pinch ramp is started. At or about the same time, wire direction is reversed thereby retracting the wire as sent through weld nozzle 144 to retract the wire away from a weld area. At 740, a pinch ramp is complete and a current output is reduced to prevent spatter within the weld area thereby maintaining integrity and consistent quality of the weld. Once the short circuit state has passed, an arc is detected at 750 wherein wire is advanced in a forward direction and current is increased to a peak level. At 760, a peak current segment is complete, wherein output is reduced to return to a steady-state condition wherein the method returns to step 720 to repeat the weld cycle as desired.

In one embodiment, controller 220, 342, 446 ("controller") is a computer operable to execute the disclosed architecture. In order to provide additional context for various aspects of the present invention, the following discussion is intended to provide a brief, general description of a suitable computing environment in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc., that perform particular tasks or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

The controller can utilize an exemplary environment for implementing various aspects of the invention including a computer, wherein the computer includes a processing unit, a system memory and a system bus. The system bus couples system components including, but not limited to the system memory to the processing unit. The processing unit may be any of various commercially available processors. Dual microprocessors and other multi-processor architectures also can be employed as the processing unit.

The system bus can be any of several types of bus structure including a memory bus or memory controller, a peripheral bus and a local bus using any of a variety of commercially available bus architectures. The system memory can include read only memory (ROM) and random access memory (RAM). A basic input/output system (BIOS), containing the basic routines that help to transfer information between elements within the controller, such as during start-up, is stored in the ROM.

The controller can further include a hard disc drive, a magnetic disc drive, e.g., to read from or write to a removable disc, and an optical disc drive, e.g., for reading a CD-ROM disc or to read from or write to other optical media. The controller can include at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile discs (DVD) or other magnetic storage devices, or any other medium which can be used to store the desired information and which can be accessed by the controller.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM, including an operating system, one or more application programs, other program modules, and program data. The operating system in the controller can be any of a number of commercially available operating systems.

In addition, a user may enter commands and information into the computer through a keyboard and a pointing device, such as a mouse. Other input devices may include a microphone, an IR remote control, a track ball, a pen input device, a joystick, a game pad, a digitizing tablet, a satellite dish, a scanner, or the like. These and other input devices are often connected to the processing unit through a serial port interface that is coupled to the system bus, but may be connected by other interfaces, such as a parallel port, a game port, a universal serial bus ("USB"), an IR interface, and/or various wireless technologies. A monitor (e.g., the display 116), or other type of display device, may also be connected to the system bus via an interface, such as a video adapter. Visual output may also be accomplished through a remote display network protocol such as Remote Desktop Protocol, VNC, X-Window System, etc. In addition to visual output, a computer typically includes other peripheral output devices, such as speakers, printers, etc.

A display can be employed with the controller to present data that is electronically received from the processing unit. For example, the display can be an LCD, plasma, CRT, etc. monitor that presents data electronically. Alternatively or in addition, the display can present received data in a hard copy format such as a printer, facsimile, plotter etc. The display can present data in any color and can receive data from the controller via any wireless or hard wire protocol and/or standard.

The computer can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

What is claimed is:

1. A retractable wire feed system used within a welder, comprising:

a friction-drive system disposed on a first side of a wire;
an idle drive roll located opposite the friction-drive system on a second side of a wire, wherein the friction-drive system advances the wire through a welding nozzle toward a workpiece; and
a brake, which is applied to retract the wire when a predetermined condition is met, the brake comprising a wheel having a bore disposed therethrough, the bore having an ingress on a distal side of the wheel and an egress on an opposed proximal side, the wire traveling through a sleeve disposed concentrically around the wire in the bore, the brake located upstream from the friction-drive system and idle drive roll relative to the welding nozzle, wherein the brake retracts the wire relative to the workpiece upon pivotal rotational movement of the wheel; and
a slip clutch that couples the friction-drive system to a drive system, the slip clutch engaged at substantially the same time as application of the brake.

2. The wire feed system according to claim 1, wherein the brake is applied upon the detection of a short circuit condition within the welding system.

3. The wire feed system according to claim 2, wherein the brake is disengaged and the friction-drive system is engaged once the short circuit condition has passed.

4. A retractable wire feed system used within a welder, comprising:
a friction-drive system disposed on a first side of a wire;
an idle drive roll located opposite the friction-drive system on a second side of a wire, wherein the friction-drive system advances the wire through a welding nozzle toward a workpiece;
a brake, which is applied to retract the wire when a predetermined condition is met; and wherein said predetermined condition comprises at least
a short circuit state wherein the wire is shorted to a workpiece pursuant to a waveform comprising current or voltage or both,
the brake comprising a wheel having a bore disposed therethrough, the bore having an ingress on a distal side of the wheel and an egress on an opposed proximal side, the wire traveling through a sleeve disposed concentrically around the wire in the bore, the brake located upstream from the friction-drive system and idle drive roll relative to the welding nozzle, wherein the brake retracts the wire relative to the workpiece upon pivotal rotational movement of the wheel.

5. The retractable wire feed system according to claim 4, wherein
the brake is disengaged and the friction-drive system is engaged once the short circuit condition has passed.

6. A retractable wire feed system used within a welder, comprising:
a friction-drive system disposed on a first side of a wire;
an idle drive roll located opposite the friction-drive system on a second side of a wire, wherein the friction-drive system advances the wire through a welding nozzle toward a workpiece;
a brake, which is applied to retract the wire when a predetermined condition is met; and wherein said predetermined condition comprises at least
a short circuit state wherein the wire is shorted to a workpiece pursuant to a waveform comprising current or voltage or both;
wherein current is increased during the short circuit state to pinch the wire from the workpiece and triggering an output to engage a reverse drive roll; and
further wherein after the wire is pinched from the workpiece, the current is decreased, said reduction in current triggering an output to engage a forward drive roll
the brake comprising a wheel having a bore disposed therethrough, the bore having an ingress on a distal side of the wheel and an egress on an opposed proximal side, the wire traveling through a sleeve disposed concentrically around the wire in the bore, the brake located upstream from the friction-drive system and idle drive roll relative to the welding nozzle, wherein the brake retracts the wire relative to the workpiece upon pivotal rotational movement of the wheel.

7. The retractable wire feed system according to claim 6, wherein
the brake is disengaged and the friction-drive system is engaged once the short circuit condition has passed.

8. A retractable wire feed system used within a welder, comprising:
a friction-drive system disposed on a first side of a wire;
an idle drive roll located opposite the friction-drive system on a second side of a wire, wherein the friction-drive system advances the wire through a welding nozzle toward a workpiece;
a brake, which is applied to retract the wire when a predetermined condition is met; and wherein said predetermined condition comprises at least
a detection of an arc;
a detection of a short circuit state wherein the wire is shorted to a workpiece pursuant to a waveform comprising current or voltage or both;
wherein the current is increased during the short circuit state to pinch the wire from the workpiece and triggering an output to engage a reverse drive roll; and
further wherein after the wire is pinched from the workpiece, the current is decreased; and
still further wherein the current is increased or when an arc is detected, an output to engage a forward drive roll is generated,
the brake comprising a wheel having a bore disposed therethrough, the bore having an ingress on a distal side of the wheel and an egress on an opposed proximal side, the wire traveling through a sleeve disposed concentrically around the wire in the bore, the brake located upstream from the friction-drive system and idle drive roll relative to the welding nozzle, wherein the brake retracts the wire relative to the workpiece upon pivotal rotational movement of the wheel.

9. The retractable wire feed system according to claim 8, wherein
the brake is disengaged and the friction-drive system is engaged once the short circuit condition has passed.

10. The retractable wire feed system according to claim 4, which further comprises:
a slip clutch that couples the friction-drive system to a drive system, the slip clutch engaged at substantially the same time as application of the brake.

11. The retractable wire feed system according to claim 6, which further comprises:
a slip clutch that couples the friction-drive system to a drive system, the slip clutch engaged at substantially the same time as application of the brake.

12. The retractable wire feed system according to claim 8, which further comprises:
a slip clutch that couples the friction-drive system to a drive system, the slip clutch engaged at substantially the same time as application of the brake.

* * * * *